Sept. 25, 1934.  B. FREUND  1,974,709
APPARATUS FOR MAKING SOUND AND PICTURE RECORDS ON FILMS
Filed Aug. 10, 1929  3 Sheets-Sheet 1
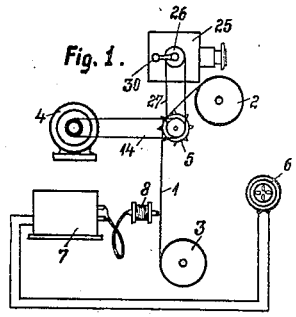
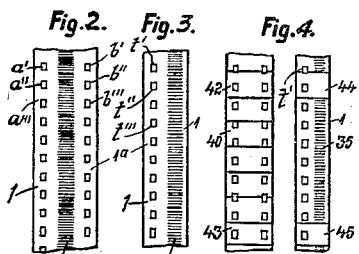
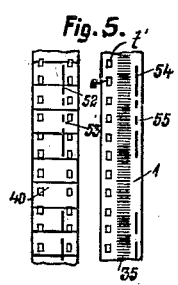
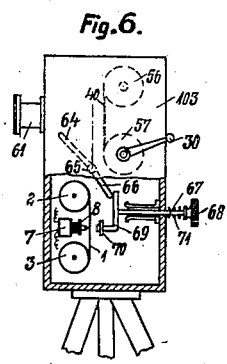
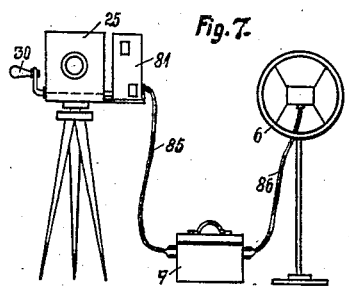
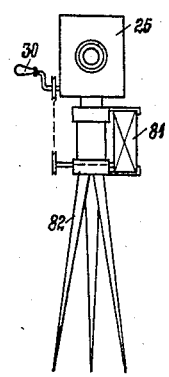
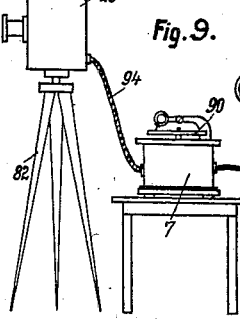
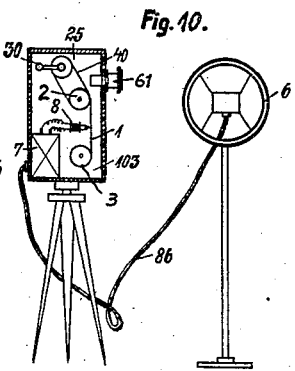

Sept. 25, 1934.      B. FREUND      1,974,709
APPARATUS FOR MAKING SOUND AND PICTURE RECORDS ON FILMS
Filed Aug. 10, 1929      3 Sheets-Sheet 2
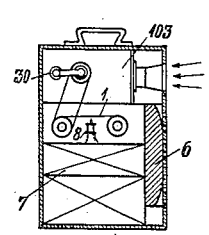
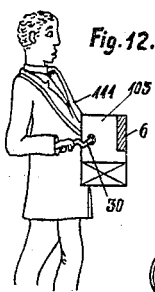
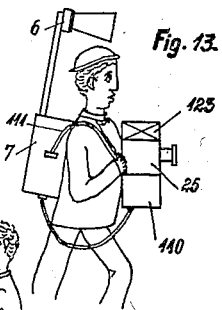
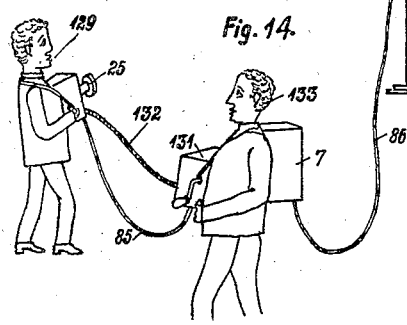
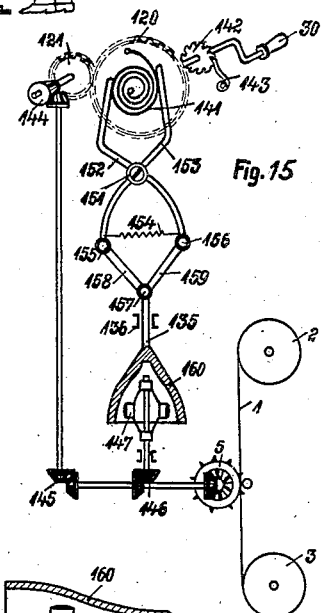
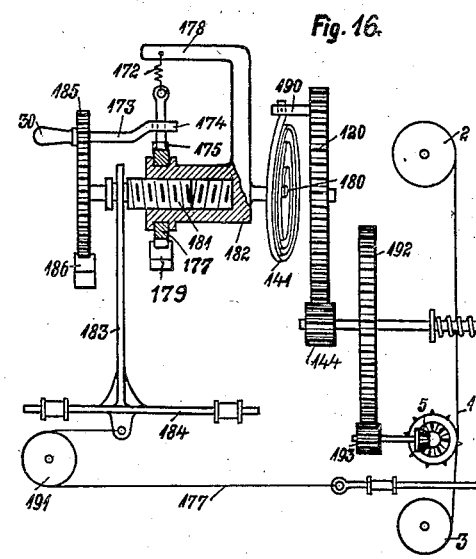

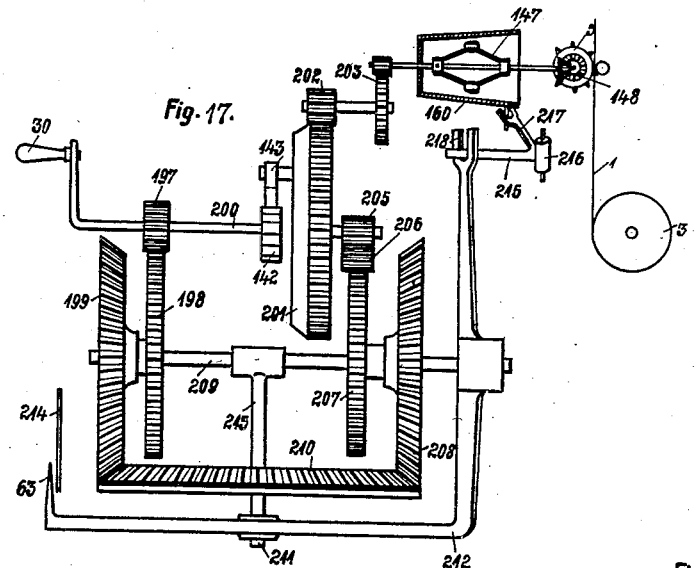

Patented Sept. 25, 1934

1,974,709

UNITED STATES PATENT OFFICE 1,974,709

APPARATUS FOR MAKING SOUND AND PICTURE RECORDS ON FILMS

Berthold Freund, Berlin, Germany, assignor to Internationale Tobis Maatschappij, N. V., Amsterdam, Netherlands Application August 10, 1929, Serial No. 385,000
In Germany August 20, 1928

4 Claims. (Cl. 88—16.2)

My invention relates to an apparatus for making sound and picture records on films.

It is an object of my invention to provide an apparatus by which such records may be made anywhere and not only at a studio, it being intended to make such records in the field, in forests, in broken country, in short, under the most difficult conditions.

To this end, I subdivide the equipment required for making the sound and picture records into separate appliances, for instance, I provide an appliance for making a sound record, a camera for making a picture record, and a driving mechanism. The individual appliances are so designed as to be separately portable during their operation, as against the stationary equipment at the studio, and are connected by flexible conduits for transmitting electric energy and power.

The sound record "as made" is copied on a film for reproduction and this film may be reproduced separately or together with a picture film, as desired.

In this manner, I may take sound records wherever sound is generated, whereas heretofore operators were generally limited to a studio, with its technical facilities for making sound records. Obviously, this is not satisfactory as there are many acoustic phenomena which are extremely interesting but were heretofore beyond reach of the clumsy and difficult apparatus of the studio. Thus, daily events of any kind, meetings, interviews, speeches, street accidents, sports and games, phenomena in the open air, voices of animals in forests etc., gales, surfs, songs of savages, etc., could not be recorded.

According to my invention, this inconvenience is eliminated, and infinite possibilities are opened to the tone film. Moreover, my invention may be applied to considerable advantage wherever the high cost of tone film apparatus, or their difficult operation, or their being restricted to studios, prevented photographers, private persons, and others from adopting them.

In the drawings affixed to this specification, I have illustrated my apparatus by more or less diagrammatic figures.

In the drawings

Fig. 1 illustrates an apparatus for taking a sound record in combination with a picture camera, Figs. 2 to 5 illustrate various types of records, Fig. 6 illustrates an apparatus for making phase marks on a sound and on a picture film, Fig. 7 illustrates an apparatus consisting of independent units, with the sound-recording apparatus secured to a camera, Fig. 8 illustrates a camera with the apparatus on its stand, Fig. 9 illustrates a system having a phonograph as the recording apparatus, Fig. 10 illustrates the recording apparatus combined with a camera in the same casing, Fig. 11 shows a similar combination which, however, includes the microphone, Figs. 12 to 14 illustrate various portable systems, Figs. 15 to 17 are, partly sectional, elevations of equalizing mechanisms, Figs. 18 and 19 illustrate indicators for the equalizing mechanisms illustrated, Fig. 20 illustrates means for winding cables which are used in connection with my apparatus, and Fig. 21 shows this mechanism applied to the system illustrated in Fig. 7.

Referring now to the drawings, identical parts have been marked with the same reference numerals in all figures.

Referring now to the drawings, and first to Fig. 1, the sound record 1, which may be a band of steel or other magnetizable material, is mounted on sprockets 2 and 3 and presented to an amplifier 7, for instance, a microphone, with a recording magnet 8. 25 is a camera for exposing a picture film, 27 is a belt or chain connecting a pulley or sprocket on the feeding cylinder 5 with a corresponding part 26 on the camera. Any means may be provided for moving the sound record at higher speed than the film, not shown, in the camera 25, for exactly recording the sound. A crank 30 may be provided on the shaft of the pulley or sprocket 26, for operating the camera 25 by hand if desired.

Referring now to Fig. 2, the sound record 1 on which a central sound curve is indicated at 35, is equipped with two parallel rows of holes $a'$, $a''$, $a'''$ etc. and $b'$, $b''$, $b'''$ etc. along its edges. A one-sided arrangement is shown in Fig. 3, with holes $c'$, $c''$, $c'''$ etc. on one side only, and the curve 35 at the other.

Referring to Fig. 4, 40 is a picture film, 1 is the sound record, with the curve 35 and one-sided holes $c'$ etc., and 42, 43, and 44, 45 are phase marks on the film and the record, respectively, which permit the film and the record to be inserted in the proper relative positions, and to observe during the operation whether the film and the record still are in this condition. Instead of making such phase marks a priori, they may be made while the primary record is being copied on the film, as shown in Figs. 5 and 6. The film 40 for reproduction and the sound record 1 are imprinted with marks 52, 53, and 54, 55, respectively, resembling Morse signs. The marks do not interfere with the records and the pictures.

This operation may be performed in the apparatus illustrated in Fig. 6 in which the system of the sound record 1 and the camera for the film 40, are combined in a single casing 103, 30 being the crank for operating the camera, and 56, 57 being the reels for the film 40, 2, 3 are the record sprockets, 7 is the amplifier or microphone, and 8 is its magnet, as described with reference to Fig. 1. 68 is a push button on the outer end of a bar 67 which is fitted to slide in the casing 103 opposite the sound record 1, 71 is a spring tending to return the push button to its initial position, 70 is a stylus at the inner end of the bar, being secured to a cross head 69 at the bar, 66 is a lever on a pin 65 which is adapted to be rocked about its pin by the cross head 69, and 64 is a screen opposite the lever 66. When the push bar 67 is moved into the casing 103, a mark is imprinted on the primary record 1, and at the same time, the screen 64 is moved toward the film 40, preventing exposure of the screened part. By marking the phases with Morse signs or the like, as shown in Fig. 5, the relative position of the film and the record is exactly determined.

Referring now to Fig. 7, this system is divided into four units: The camera 25, with its crank 30, a box 81 in which the sound record 1 is moving, the amplifier 7, and the microphone 6, 85 and 86 being cables extending from the box 81 to the amplifier, and from the amplifier to the microphone. The box for the amplifier may be made as a portmanteau for convenience. Batteries may also be mounted in the portmanteau. It will be understood that with long cables, and light units, this system is very adaptable. Instead of being secured to the camera the box 81 might be secured to its stand 82, Fig. 8. In both cases the box is readily exchangeable which facilitates and expedites the operation. Its size may be such that the sound record is exchanged with the film. The lengths of the several records 1 may also be so determined that their length is sufficient for the corresponding picture film 40, and the record is exchanged together with the film.

In Fig. 9, a phonograph 90 is illustrated as combined with the amplifier 7, the primary record being here the flat record of the phonograph. 94 is a flexible shaft extending to the camera 25 from the phonograph 90, and 86 is a cable connecting the microphone 6 to the amplifier 7.

Referring to Fig. 10, this shows the camera and the sound system in a single casing 103 as in Fig. 6, with the amplifier 7 in the casing. The microphone 6 is connected to the amplifier 7 by cable 86. In Fig. 11, the microphone 6 is carried in the casing 103.

Fig. 12 shows the casing of Fig. 11 equipped with a strap 111 for carrying it on the shoulders, the camera, however, being omitted here. Fig. 13 shows a divided system, with the camera 25 and the sound-recording apparatus combined in a casing carried in front of the operator, the amplifier 7 on his back, and the microphone 6 projecting above his head 123 is a box containing switching means. A strap 111 connects the two units. Another divided system for three persons is shown in Fig. 14. Here, the operator 129 carries the camera 25 and the sound-recording apparatus, assistant 133 carries a driving mechanism 131 with a flexible shaft 132 extending to the operator's system, and he also carries the amplifier 7, while assistant 134 is entrusted with the microphone 6. Cables 85 and 86 are provided as described with reference to Fig. 9. The object of carrying the camera etc. on one man, and the driving mechanism on another, is to avoid vibrations of the camera etc.

Means for equalizing the velocity of rotation will now be described.

The mechanism illustrated in Fig. 15 effects very constant speed at the driven part, even with a manually operated crank 30, and this is very important, as variations in the speed of the record sprockets 2, 3 cause very unpleasant irregularities of the rendering. The idea underlying this, and the other mechanisms which will be described is to equalize the variations in the speed of the driven member by an energy accumulator, such as a spring, a weight, a compressible fluid, etc., in combination with speed regulators such as centrifugal governors, or the like. The governor equalizes the small variations to which the energy accumulator itself is subjected. In Fig. 15, 142, 143 are a ratchet wheel with its pawl which is secured on the shaft of the crank 30. 141 is a spiral spring which is secured to the crank shaft at one end, and to a gear wheel 120 at the other. 121 is a pinion in mesh with the gear wheel 120, and 144, 145 is a train of bevel gears and shafts which connect the pinion 121 with the feed cylinder 5 of the primary record 1. 147 is a centrifugal governor which is actuated by a bevel gearing 146 on the shaft 145. 160 is a bell-shaped stop at the lower end of a rod 135 which is fitted to slide in a bearing 136. 158, 159 are links pivoted to the rod 135 at 157, and to a pair of double-armed levers 152, 153 at 155 and 156. The two levers are jointed to each other at 151, and their upper ends are adapted to engage the spring 141. 154 is a spring tending to pull their lower ends together. It will be understood that the outer diameter of the spring 141 varies with its tension, and the ends 155, 156 of the two levers will move in conformity. This results in parallel displacement of the rod 135 and the bell stop 160. The stop is curved on the inside in conformity with the additional regulations required. In this manner the uniformity of the drive is governed by two factors: The rotation of the governor 147, and, in addition, the regulation of the centrifugal governor by the stop 160.

Referring now to Fig. 16, 185 is a gear wheel on which the handle or crank 30 is arranged, 186 is a pawl cooperating with the gear wheel, 181 is a threaded spindle on which the gear wheel 185 is keyed, 182 is a threaded boss seated on the spindle, 178 is an arm on the boss, 175 is an arm fitted to turn about the boss 182, the boss being toothed at 177, and equipped with a pawl 179, 172 is a spring extending from the outer end of the arm to the arm 178, and 173 is a fork extending from the gear wheel 185 and engaging the arm 176. The spring 141 is here secured on a square on the end of the boss 182 with one end, and on a pin 190 on the wheel 120 with the other. Pinion 144 is here keyed on the shaft of the governor 147, a gear wheel 192 being also keyed on the shaft and meshing with a pinion 193 which in turn rotates the feeding cylinder 5 for the primary record 1. 183 is an upright extending from a slide 184 to a groove in the spindle 181, 191 is a sheave, 177 is a cable extending about the sheave and secured to the slide 184 at one end, and to a slide 179 at the other. This slide, which is equipped with a pull-back spring 170, supports the bell 160 of the governor 147.

When the system rotates uniformly, no tension is put on the spring 141 and the spring 172 is not deformed. When, however, any lack of uniformity occurs in the system the spring 141 will be put under tension, causing the arm 178, and the sleeve 182, to lag with respect to the crank 30. In proportion to the angle through which the crank is displaced with respect to the arm 178, the spindle 181 is displaced axially, and this displacement is transmitted to the stop 160.

In this mechanism only the tension of the spring and not its size is utilized for controlling the governor 147.

Referring now to Fig. 17, 200 is the shaft of the crank 30, 142 and 143 are the ratchet wheel and pawl on the shaft, 201 is a geared casing for the spring 141, 202 is a pinion meshing with the gear teeth on the casing, 203 is another gearing, 147 is the governor to which rotation is imparted through the gearings 202, 203 from the crank 30, 5 is the feeding cylinder to which rotation is imparted from the shaft of the governor 147, and 160 is the bell-shaped governor stop.

197 is a pinion on the crank shaft 200, 198 is a gear wheel in mesh with the pinion and keyed on a shaft 209, 207 is another gear wheel on the shaft which meshes with a pinion 206 which in turn meshes with a pinion 205 on the spring casing 201, 199 is a planet bevel wheel which is connected with the gear wheel 198, 208 is another planet wheel connected with the gear wheel 207, and 210 is the sun wheel of the two planet wheels. This sun wheel is rotatably carried on a bracket 213 which is fitted to rock about the shaft 209. 212 is a double-armed lever which is also fitted to rock about the shaft 209, 211 is a pin connecting it with the bracket 213 of the sun wheel 210, 218 is a fork at one end of the lever 212. 215, 217 is a bell crank lever fulcrumed about 216, its arm 215 being engaged by the fork 218, and its arm 217 engaging a pin on the bell stop 160. 63 is an indicator at the other end of the lever 212, and 214 is a graduation along which the indicator moves.

It will be understood that the crank 30 rotates the planet wheel 198 in one, and the spring casing 201 rotates the planet wheel 208 in the opposite direction, the ratios being equal. The sun wheel 210 consequently performs a bodily rotation about the shaft 209 which is proportional to the difference of the numbers of revolution of the planes wheels which is utilized for regulating the bell stop 160, and for operating the indicator 63.

Referring now to Fig. 18, 215 is the central or normal mark of the graduation 214, and 216' and 217' are the limit marks indicating the maximum and minimum load on the spring 141. Fig. 19 shows acoustic means for signalling when the indicator 63 has attained the mark 216' or 217'. 218' and 219 are levers each provided with a hammer 222 and 223 for a bell 220 and 221, with pull-back springs 224 and 225. The levers are alternately engaged by the indicator 63 and the bells are pitched to a high and a low tone. Obviously, electric contacts for operating any suitable signals might be provided instead of the mechanically operated bells as shown.

The principle underlying the several equalizing mechanisms shown and described is that energy is stored for compensating irregularities of the drive. Instead of a spring 141 as described, I may provide any other accumulators, compressed air, weights, etc. Notwithstanding this equalization, slight variations may still occur, and these are made up for by the additional regulation by the bell stop 160.

Referring now to Fig. 20, this shows means for winding conductor cables, for instance, the cables 80 85, 86, Fig. 7. The object is to wind the cables, or to unwind them, without interfering with their function and without their being ravelled. 230 is a shaft, 231 is a crank on the shaft, 232 is a drum on the shaft, 239 is a clutch, and 240 is a motor. The cable 86 from the microphone 6 is secured in a flange of the drum with its ends 233, 234. 235, 236 are collectors on the shaft 230. 237, 238 are brushes in contact with the collectors and 85 is the cable of the amplifier 7 which is connected to the brushes with its ends. 239 is a friction clutch and 240 is a motor for rotating the shaft 230 instead of the crank 231. In this manner the effective length of the cable may be varied without interrupting its connection with the other cable. With the friction clutch 239 a constant torque is exerted on the shaft 230 and the drum 232 so that the cable is normally wound on the drum but may be unwound by pulling it.

Fig. 21 shows two winding appliances 250 and 251, as shown in Fig. 20, on the amplifier 7 for winding the cables 85 and 86. Obviously the winding appliances might be connected to the other ends of the cables.

It is understood that my invention may be modified in various ways without departing from its gist, and some of the devices described may even be used in connection with other apparatus than those described. For instance, the several equalizers described with reference to Figs. 15 to 17, and the winding appliance described with reference to Figs. 20 and 21, are not limited to the application in connection with the record-taking apparatus described.

I claim:

1. An apparatus for making sound and picture records on films comprising appliances which are separately portable during their operation, for making the sound and for making the picture record on the film, flexible conduits connecting said appliances, a winding drum for the reception of one of said conduits, means for driving said winding drum, and a slip contact operatively connected to said drum for connecting the conduit on said drum to another one of said conduits.

2. In an apparatus for making sound and picture records, appliances which are separately portable during their operation for making the sound record and for making the picture record comprising means for recording the sounds on a sound record bearer and the pictures on a picture record bearer, manually operated driving means, a power accumulator, and a flexible shaft connecting said power accumulator with said means for recording the sounds and pictures, said manually operated driving means with said power accumulator constituting an appliance portable separately from the means for recording the pictures.

3. In an apparatus for making sound and picture records, appliances which are separately portable during their operation for making the sound record and for making the picture record comprising means for recording the sounds on a sound record bearer and the pictures on a picture record bearer, manually operated driving means, a power accumulator, a flexible shaft connecting said power accumulator with said means for recording the sounds and pictures, a separately portable amplifier for the sound record having operative connections with said sound recording means for amplifying the sounds prior to the recording thereof on said sound record bearer, said manually operated driving means with said power accumulator constituting an appliance portable separately from the means for recording the pictures.

4. In an apparatus for making sound and picture records, appliances which are separately portable during their operation for making the sound record and for making the picture record comprising a microphone adapted to have the sound waves impressed thereon and means for recording the sounds on a sound record bearer and the pictures on a picture record bearer, manually operated driving means, a power accumulator, a flexible shaft connecting said power accumulator with said means for recording the sounds and pictures, said apparatus being subdivided into three groups each adapted to be carried by an individual operator, the first group comprising the means for recording the sound and picture records, the second group comprising the driving means and the third group comprising the microphone, and a flexible conduit connecting the first group to the third group.

BERTHOLD FREUND.